United States Patent [19]

Young et al.

[11] 4,336,772
[45] Jun. 29, 1982

[54] WATER VAPOR INJECTION SYSTEM

[76] Inventors: Don H. Young, 2215 N. 38th Way, Phoenix, Ariz. 85008; Russell W. Wellman, 141-40 Dryke Rd., Sequim, Wash. 98382

[21] Appl. No.: 120,691

[22] Filed: Feb. 11, 1980

[51] Int. Cl.$^3$ ............................................. F02D 19/00
[52] U.S. Cl. ............................... 123/25 L; 123/25 A; 123/198 A; 261/18 A
[58] Field of Search ............... 123/25 R, 25 A, 25 L, 123/25 N, 25 J, 198 A; 261/18 A, DIG. 66

[56] References Cited

U.S. PATENT DOCUMENTS 2,965,085  12/1960  Kahler ............................ 123/1 A
4,030,456   6/1977  Corpus ........................... 123/25 B Primary Examiner—Charles J. Myhre
Assistant Examiner—E. Rollins Cross
Attorney, Agent, or Firm—Cahill, Sutton & Thomas

[57] ABSTRACT

A vapor injection system for introducing water vapor into an internal combustion engine includes a housing having first, second, and third chambers within the housing. An inlet conducts water into the first chamber from an unpressurized water container. A filter separates the first chamber from the second chamber. A small orifice extends from the second chamber into a third chamber. An airtight tube connects the third chamber to an opening in a carburetor of the internal combustion engine, the opening being located above a throttle valve of the carburetor. When the engine is running, reduced air pressure exists in the carburetor above the throttle valve and therefore in the third chamber. The orifice is sufficiently small that water passing from the second chamber into the lower pressure third chamber immediately vaporized as it enters the third chamber. The water vapor passes through the tube into the carburetor.

If desired, a thin tube can extend from the end of aperture 43 a predetermined distance into chamber 47. In certain instances this will improve the vaporization of water flowing from chamber 41 into chamber 47.

9 Claims, 4 Drawing Figures

WATER VAPOR INJECTION SYSTEM

BACKGROUND OF THE INVENTION

1. Field of the Invention

The invention relates to devices for introducing water, especially water vapor, into carburetion systems for internal combustion engines.

2. Description of the Prior Art

It is well known that internal combustion engines, especially gasoline powered engines, operate more cleanly, at cooler temperatures, and more efficiently if water or water vapor is introduced into the combustion chambers along with the fuel/air mixture. In the past, liquid water injection systems have been utilized to inject water into carburetion systems for gasoline powered engines in order to achieve the above benefits. However, known water injection systems have suffered from various shortcomings, including the shortcomings of being unduly expensive and unreliable and of not injecting suitable amounts of water over the entire operating range of the engine. Since it is well known that pre-ignition or "pinging" is greatly reduced when proper amounts of water vapor are introduced into combustion chambers of gasoline engines along with the fuel/air mixture, with the advent of gasoline shortages and occasional deterioration in the quality and octane rating of gasoline available at service stations, there is an unmet need for a reliable, low cost system for introducing water vapor into gasoline engine combustion chambers in suitable amounts to obtain the above mentioned benefits.

Accordingly, it is an object of the invention to provide a reliable, low cost system for producing water vapor from liquid water and introducing water vapor in suitable amounts into the carburetion system of a gasoline engine to reduce pre-ignition.

It is another object of the invention to provide a low cost water vapor injection system for gasoline engines which enable them to be tuned to operate more efficiently without occurrence of excessive pre-ignition.

SUMMARY OF THE INVENTION

Briefly described, and in accordance with one embodiment thereof, the invention provides a vapor injection device and method for introducing water vapor into an internal combustion engine. The system includes a housing having first, second, and third chambers therein. In the described embodiment of the invention, the housing is formed of plastic and includes an upper section sealably attached to a lower section of the housing. The lower section bounds the first chamber. An inlet extends from an outer wall of the lower section to the first chamber. An inlet connector is connected by means of an airtight connection to a flexible hose in which liquid water is conducted from an unpressurized water container. The upper and lower sections are tightly connected together by means of screws. A rubber O-ring sealing gasket is disposed between the upper and lower sections to produce an airtight connection of the upper section to the lower section. A fibrous disc-shaped filter separates the first chamber from a second chamber. The second chamber is disposed in the upper section of the housing. The second chamber is dome-shaped. The third chamber is disposed above the second chamber. A small orifice extends from the second chamber to the third chamber. An outlet opening extends from the third chamber through the wall of the upper section of the housing to an outlet connector. A vacuum hose connected by means of an airtight connection to an outlet connector extends to another connector which extends through the wall of a carburetor at a point located above a throttle valve of the carburetor. The outlet connections to the third chamber are airtight so that reduced pressure in the carburetor above the throttle valve thereof also exists in the third chamber, tending to draw water from the water container into the first chamber and through the filter into the second chamber. The reduced pressure in the third chamber causes water in the second chamber to flow through the orifice to the boundary of the third chamber. The size of the orifice is sufficiently small that the reduced pressure in the third chamber causes water flowing through the orifice to be immediately vaporized in the third chamber. The water vapor flows through the outlet and the vacuum hose and is injected into the carburetor.

DESCRIPTION OF THE INVENTION

Figure 1:
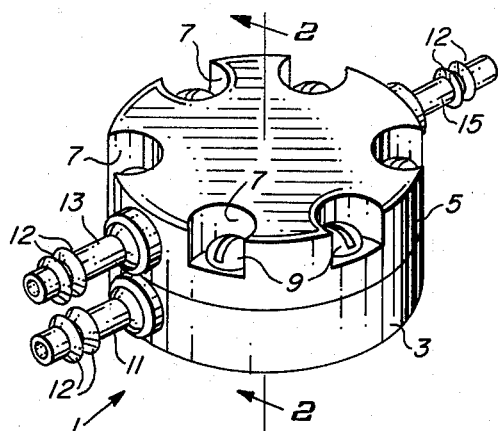
FIG. 1 is a perspective view of the water vaporizer of the present invention.

Referring now to FIG. 1, water vaporizer 1 includes an upper housing section 5 and a lower housing section 3 connected together by means of a plurality of screws 9. Upper section 5 includes a number of peripheral semi-cylindrical cutaway sections 7 for accommodating the heads of screws 9. Upper and lower housing sections 5 and 3 are generally cylindrical in configuration. In the described embodiment of the invention, housing sections 3 and 5 are composed of nylon.

An inlet connector 11, also composed of nylon, extends from the cylindrical wall of lower housing section 3. An outlet connector 15 extends from the cylindrical wall of upper housing section 5. An auxiliary connector 13 extends from the cylindrical wall of upper housing section 5 opposite to outlet connector 15.

Each of connectors 11, 13 and 15 has a plurality of tapered ribs 12 to facilitate airtight connection of suitable hoses, such as conventional "vacuum" hoses thereto, as subsequently explained with reference to FIG. 4.

Figure 3:
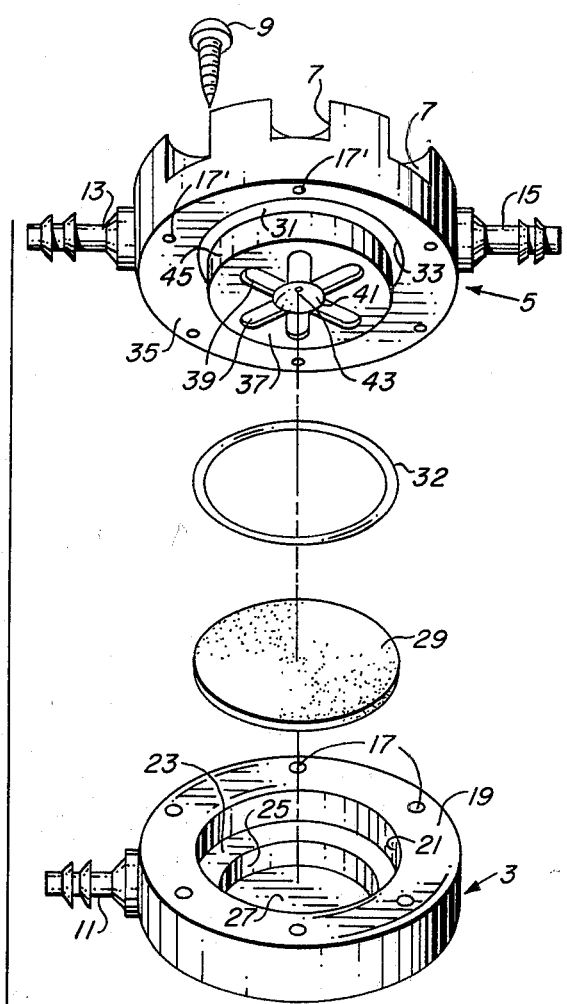
FIG. 3 is an exploded perspective view of the water vaporizer of FIG. 1.
Figure 2:
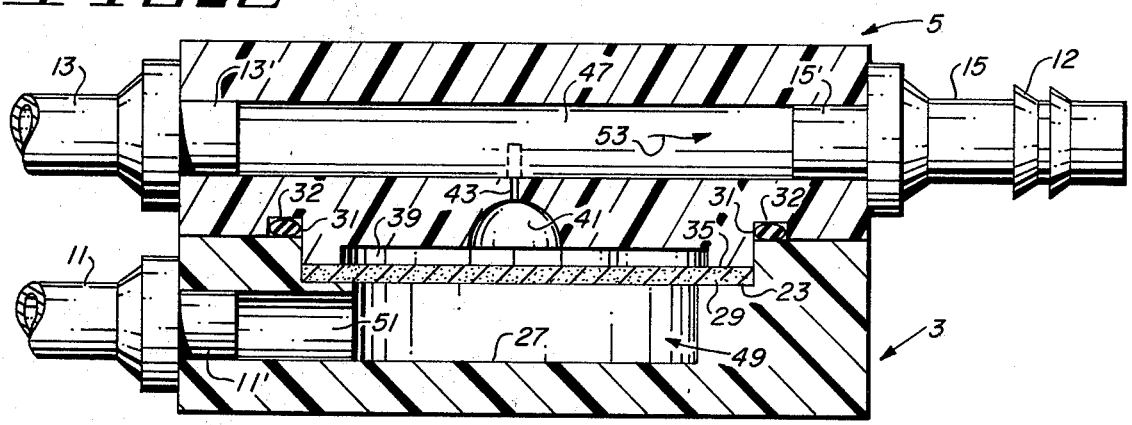
FIG. 2 is a section view taken along section line 2—2 of FIG. 1.

The internal configuration of water vaporizer 1 is best understood with reference to FIGS. 2 and 3. Referring now to FIGS. 2 and 3, it is seen that lower housing section 3 has a flat upper surface 19. A cylindrical opening 21 is disposed in lower housing section 3 concentric with the cylindrical outer surface thereof. A second cylindrical opening extends downward to flat bottom 27 from a flat shoulder surface 23 which is parallel to surface 19. Bottom 27 and cylindrical surface 25 bound a first chamber within water vaporizer 1, which first chamber is also bounded by fibrous disc-shaped filter 29. Filter 29 can be made of either procelain or plastic fibrous material capable of filtering particles as small as approximately five microns from water which is drawn into the first chamber through inlet connector 11 and then is drawn into the second chamber.

As best seen in FIG. 2, inlet connector 11 has a cylindrical stud 11' which fits snugly into a tubular passage 51 extending from the cylindrical wall of lower housing section 3 to the first chamber, which is designated by reference numeral 49 in FIG. 2.

Upper housing section 5 includes a cylindrical extension 45 having a flat bottom surface 37. Cylindrical extension 45 is concentric with the cylindrical outer surface of housing section 5. A dome-shaped chamber 43 is centrally disposed in cylindrical extension 45. A plurality of lateral passages 39 extend radially outward from the lower peripheral edges of chamber 43.

A circular slot 31 accommodates an O-ring rubber gasket 32 which provides an airtight seal between upper housing section 5 and lower housing section 3 when they are tightly attached together by means of screws 9.

When screws 9 are tightened, flat surface 35 of upper housing section 5 is drawn tightly against flat surface 19 of lower housing section 3. The peripheral portions of surface 37 of cylindrical extension 45 of upper housing section 5 are then spaced from shoulder surface 23 of lower housing section 3 such that disc-shaped filter 29 is securely supported as shown in FIG. 2 Disc-shaped filter 29 thus separates first chamber 49 from second chamber 47.

A plurality of threaded screw holes 17 peripherally disposed around cylindrical opening 21 of lower housing section 3 are aligned with hole 17' extending through the various semi-cylindrical cutaway portions of upper housing section 5. Screws 9 extend through hole 17' and engage threaded holes 17 to tighten upper housing section 5 to lower housing section 3.

A horizontal tubular third chamber 47 is disposed in upper housing section 5 above second chamber 41. Outlet connector 15 has a cylindrical extension 15' which snugly fits into the right end of third chamber 47 to form an airtight connection thereto. Optional connector 13 has a cylindrical extension 13' which fits snugly into the opposite end of third chamber 47 to form an airtight seal therewith.

It should be noted that optional connector 13' can be omitted if third chamber 47 does not extend all the way to the left portion of upper housing section 5, as shown in FIG. 2.

In accordance with the present invention, a small orifice 43, which typically can be in the range from seven to fourteen mils in diameter, extends from the top of dome-shaped second chamber 47.

Figure 4:
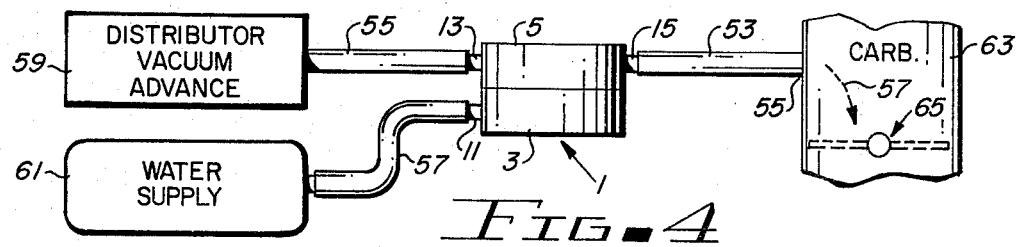
FIG. 4 is a schematic diagram illustrating connection of the water vaporizer of FIG. 1 to a carburetor, a water container, and a distributor vacuum advance unit.

The connection of water vaporizer 1 to a carburetor 63 of an internal combustion engine and to an unpressurized water supply container 61 is shown in FIG. 4. An airtight hose 57 is sealably connected to inlet connector 11 of lower housing section 3. Water supply container 61 is preferably located at a lower level than inlet connector 11.

Outlet connector 15 is connected by means of a vacuum hose to an inlet 55 of carburetor 63. Inlet 55 is located slightly above throttle valve 65 of carburetor 63. The connection of the vacuum hose 53 to both inlet connector 55 of carburetor 63 and outlet connector 15 of upper housing section 5 is airtight.

If water vaporizer 1 has the above mentioned optional connector 13, vacuum hose 55 can be sealably connected to optional connector 13. Vacuum hose 55 is connected to the vacuum connector of distributor vacuum advance unit 59. Provision of optional connector 13 is merely a matter of convenience, as vacuum hose 55 could be connected directly to vacuum hose 53.

In operation, a typical gasoline powered automobile engine produces a pressure at carburetor inlet 55 of roughly twenty inches of mercury when the engine is idling. If the throttle 65 is opened substantially all the way, the pressure at inlet 55, and hence in third chamber 47, drops to approximately five inches of mercury. At highway cruising speeds on substantially level highway, the pressure in third chamber 47 is typically approximately fifteen inches of mercury. It has been found that with a diameter of four or more mils for orifice 43, a sufficient amount of water vapor is created in third chamber 43 and is injected into carburetor 63 at highway cruising speeds to significantly improve gasoline mileage. Pre-ignition or pinging is reduced, enabling the user to increase the compression ratio and/or advance the spark timing to achieve greater operating efficiency, or to use lower octane gasoline without excessive pinging.

It is not completely understood why water drawn to the boundary of third chamber 47 through orifice 43 vaporizes so quickly and completely at the above mentioned pressures, but it is believed that breaking of surface tension at the mouth of orifice 43 at the boundary of third chamber 47 causes the water to break up into many tiny droplets which quickly vaporize at the low pressures in third chamber 47 and at the elevated ambient temperatures surrounding water vaporizer 1 when it is installed under the hood of an automobile. The water vaporizer 1, as actually installed in the manner shown in FIG. 4, is supported by the tubes shown in FIG. 4 in the engine compartment of an automobile, and consequently the temperature of water vaporizer 1 increases substantially as the automobile engine warms up.

While the invention has been described with reference to a particular embodiment thereof, those skilled in the art will be able to make various modifications to the disclosed structure and method without departing from the true spirit and scope of the invention. For example, upper and lower housing section 3 and 5 may be provided with mating threads, so that screw holes 17 and 17' and screws 9 can be eliminated. Alternatively, sonic welding techniques or crimping techniques (if the housing sections are made of metal) can be utilized to seal the upper and lower housing sections together. The upper and lower housing sections can be made of a wide variety of suitable materials, such as polypropelene, or metals such as brass.

What is claimed is:

1. A vapor injection system for introducing water vapor into an internal combustion engine, said system comprising in combination:

a housing having a first chamber therein;

a container for holding liquid water, said container being unpressurized;

inlet means for conducting said liquid water from said container into said first chamber, said housing also having a second chamber therein;

filter means disposed between and separating said first and second chambers for filtering water passing from said first chamber into said second chamber;

orifice means extending from said second chamber into a third chamber for conducting liquid water in said second chamber to a boundary of said third chamber and effecting vaporization of said water at said boundary when the air pressure in said third chamber is substantially reduced from ambient atmospheric pressure; and outlet means for conducting water vapor from said third chamber into a portion of a carburetor located above a throttle valve of the carburetor, the carburetor being connected to the internal combustion engine, said outlet means being airtight to cause air pressure in said third chamber to be substantially equal to air pressure in said portion of the carburetor.

2. The vapor injection system of claim 1 wherein said container is positioned lower than said first chamber.

3. The vapor injection system of claim 1 wherein said first chamber is located below said second chamber to effect collecting of sediment particles in water passing into said first chamber from said container.

4. The vapor injection system of claim 3 wherein said filter means includes a disc-shaped filter, said first chamber being substantially cylindrical.

5. The vapor injection system of claim 4 wherein said second chamber is substantially dome-shaped and is of substantially smaller volume than said first chamber and wherein said orifice means extends through a top portion of said dome-shaped chamber into said third chamber.

6. The vapor injection system of claim 5 wherein said orifice means includes a cylindrical orifice having a diameter sufficiently small to effect efficient vaporization of water passing through said cylindrical orifice to said boundary of said third chamber at reduced air pressures in said third chamber resulting from vacuum produced in the carburetor above the throttle valve thereof.

7. The vapor injection system of claim 6 wherein said disc-shaped filter is composed of plastic fibrous material.

8. The vapor injection system of claim 7 wherein said housing includes an upper section and a lower section and means for sealably connecting said upper section and said lower section together and for supporting said disc-shaped filter between said upper section and said lower section so that said disc-shaped filter separates said first chamber from said second chamber and filters all water flowing from said first chamber into said second chamber.

9. A method for introducing water vapor into an internal combustion engine, said method comprising the steps of:
conducting liquid water from an unpressurized water container into a first chamber of a vapor injection device, the vapor injection device including second and third chambers;
producing a partial vacuum in the third chamber in response to a partial vacuum produced in a portion of a carburetor, the portion of the carburetor being located above the throttle valve of the carburetor;
passing liquid water from the second chamber through an orifice extending from the second chamber to the third chamber in response to the partial vacuum in the third chamber, the diameter of the orifice being sufficiently small that liquid water drawn through the orifice into the third chamber is substantially immediately vaporized; and
passing liquid water in the first chamber through a filter into the second chamber in response to the partial vacuum in the third chamber, thereby causing liquid water to be drawn into the first chamber from the water container.

* * * * *